No. 871,057. PATENTED NOV. 12, 1907.
W. E. DAVIS.
ARTIFICIAL BAIT.
APPLICATION FILED FEB. 2, 1907.

Attest:
Edgeworth Greene
Alan McDonnell

Inventor:
William E. Davis,
by S. J. Cox, Atty.

UNITED STATES PATENT OFFICE.

WILLIAM E. DAVIS, OF MORRISTOWN, NEW JERSEY.

ARTIFICIAL BAIT.

No. 871,057.　　　Specification of Letters Patent.　　　Patented Nov. 12, 1907.

Application filed February 2, 1907. Serial No. 355,368.

*To all whom it may concern:*

Be it known that I, WILLIAM E. DAVIS, a citizen of the United States, and a resident of Morristown, in the county of Morris and State of New Jersey, have invented certain new and useful Improvements in Artificial Bait, of which the following is a specification.

My invention relates to artificial bait and particularly to bait intended to be used for trolling and casting. Its objects are, among others, to provide a safe, advantageous and detachable means for securing the hooks to the body of the bait; to enable different kinds of hooks to be quickly and easily attached and detached or replaced when broken; to provide small spoons or "spinners" at the point or points where they will prove most attractive, and closely simulate the live bait, and prevent them from becoming bent or entangled with other parts of the device; and to provide a form of spinner adapted to be applied in the manner indicated which will be more effective for the purposes designed than those heretofore used.

The invention consists of the construction, combination and arrangement of parts hereinafter described and claimed and illustrated in the accompanying drawings.

Figure 1:
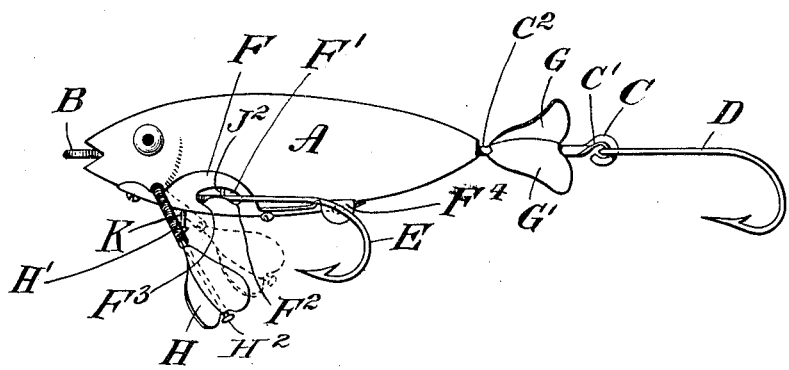
Figure 2:
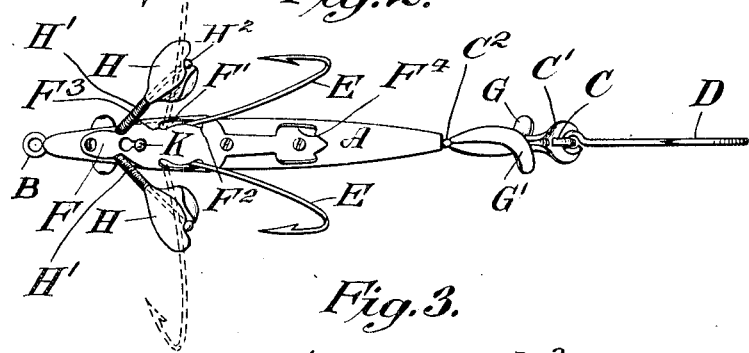
Figure 3:
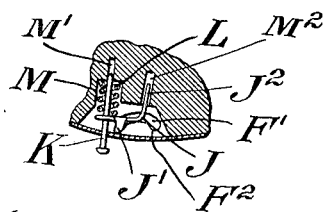
Figure 5:
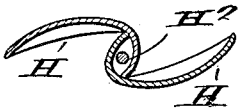
Figure 4:
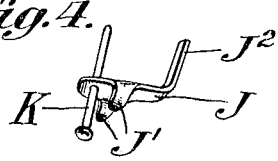

In the said drawings Figure 1 is a side view of the bait, embodying my improvements; Fig. 2 is a bottom view of the same; Fig. 3 is a detail of the mechanism for detachably securing the hooks with cut-away portions of adjacent parts; Fig. 4 is an enlarged perspective view of said mechanism. Fig. 5 is a central transverse section of one of the spinners.

The body of the bait A is preferably formed and decorated to represent a minnow, but it may be of any other suitable character. An eye B is secured to the forward end, by means of which it may be attached to a line.

On the rear end of the body A, a hook C is secured and this hook has attached to it a fish hook D which has its eye engaged with the hook C. In order to hold the said fish hook in its proper position and to prevent it from fouling with the other parts of bait and tackle, I provide a web or flange $C'$ extending laterally from both sides of the hook C. On the shank $C^2$ of the hook C between the hook proper and the body of the bait a spinner composed of spoons G, $G^1$ is rotatably mounted. The spoons are preferably made separately and then secured together by overlapping their curved inner edges and soldering or otherwise securing them together so as to leave a central aperture between them through which the shank $C^2$ is passed. The flange $C'$ is formed by taking a flat piece of metal and bending a part of it around the shank, after the hook C has been passed through the hole near the middle thereof, and then soldering if desired.

Near the forward end of the body A a pair of spinners H are secured by means of a spring connecting portion $H'$ so that they stand normally at an angle c about sixty degrees to the body projecting laterally and downwardly therefrom. The spinners are mounted on pins $H^2$ which have a head at the outer end and are secured at the inner end within the coil spring forming the shank of the resilient connection $H'$. The inner end of each of these connections $H'$ is secured to the body at substantially the angle above mentioned. It will be seen that when the bait is drawn through the water the resilient connection $H'$ will permit the spinners H to yield to the resistance of the water to a greater or less degree and cause them to assume the position indicated by the dotted lines in Fig. 1, or any other position between their normal position and the body. The movement of the spinners backward and forward depends upon the speed at which the bait is drawn through the water and it will be seen therefore that by varying this speed from one moment to another the spinners will be given an oscillatory movement in simulation of the movement of the gills of a fish, in addition to their rotary movement. The connection of the spinners with the body of the fish at this point and in the manner described also keeps them clear of the hooks and prevents them from becoming entangled with grass or other obstacles encountered in the water.

The under side of the body is cut out as shown in Fig. 3 and covered by the plate F which is secured to the said body by means of screws or similar fastenings. An extension of this plate bears the double flanges $F^4$ which act as a steering fin or keel.

On either side of the plate is a curved slot $F'$ provided with enlarged ends $F^2$ and $F^3$ through which slot the body hooks E pass. These hooks are detachably secured to curved studs $J'$ passed through their eyes and are held against detachment by the spring L strung upon the pin K extending through the plate J which carries the studs $J'$ and through the plate F. The spring L is received by recess M and the inner end of the pin is held by recess $M'$ at the top of the recess M. The pin K is soldered or otherwise secured to the plate J to prevent displacement of the parts and the upturned extension $J^2$ of the plate J works in the recess $M^2$. When the hooks are to be attached or detached the pin K is pressed inwardly until the lower ends of the studs $J'$ are removed a sufficient distance from the plate F to permit the eyes of the hooks to be passed over the ends of the studs and drawn out through the slots $F'$ or passed in through said slots and over the ends of the studs, as the case may be. As the bottom of the plate J is normally on a plane below the central portion of the slots $F'$, the hooks E can only be moved along the said slots by pressing the said plate upwardly against the pressure of the spring. In this manner means are provided for holding the hooks in a position substantially at right angles to the body of the bait (see dotted lines, Fig. 2) or in a trailing position, in either of which positions they will remain under ordinary conditions. The attachment for the hooks thus provided also prevents them from moving up and down as well as backward and forward and this tends to prevent them from becoming entangled with the forward spinners or other parts of the tackle.

What I claim is:—

1. In a device of the character described, the combination with the body of the bait of a plurality of spinners at the forward part thereof and resilient connecting pieces connecting the said spinners with the body.

2. In a device of the character described, the combination with the body of the bait of a plurality of spinners and resilient connecting pieces connecting the said spinners with the body.

3. The combination with the body of a bait provided with curved slots of a plurality of hooks secured to the said body and passing through said curved slots and a spring adapted to press the said hooks into the ends of the slots.

4. The combination with the body of a bait of a hook secured thereto, movable spring pressed studs adapted to pass through the eye of the hook and means exterior to the body portion for retracting said studs.

5. The combination with the body of a bait of a spinner composed of a plurality of bent spoons secured together and having a middle aperture, a shank connected to the body of the bait passing through said aperture, a hook at the outer end of said shank and a flange extending laterally at said outer end, said flange being formed of a piece of sheet metal, a portion of which is bent around the shank for the purpose of securing the flange thereto and is located behind the spinner.

6. In a device of the character described the combination with a body portion of a spinner, a resilient piece connecting the same to the body portion projecting at an angle to the said body portion, the spinner being mounted to permit oscillation of the said resilient portion.

7. The combination with the body of the bait of a spinner composed of a plurality of bent spoon shaped blades, a portion of the inner edge of one blade extending over a like portion of another blade the two blades united, and a pin extending between the overlapping portions.

8. In a device of the character described the combination of a body portion, a spinner, a connection between said spinner and body portion having means forming a part of said connection for permitting oscillation of the spinner and for holding it normally at an angle to the said central portion.

9. In a device of the character described the combination of a body portion, a spinner, and a connection between the spinner and the body portion which holds the said spinner normally at an angle thereto and permits oscillation of the same.

Witness my hand this 21st day of January 1907, at the city of New York, in the county and State of New York.

WILLIAM E. DAVIS.

Witnesses:
ALAN McDONNELL,
WILLIAM R. BAIRD.